United States Patent [19]

Dowdy

[11] 4,083,327
[45] Apr. 11, 1978

[54] ANIMAL GROOMING APPARATUS AND PROCESS

[76] Inventor: Murrell D. Dowdy, 910 S. Townsend, Spearman, Tex. 79081

[21] Appl. No.: 777,967

[22] Filed: Mar. 16, 1977

Related U.S. Application Data

[63] Continuation of Ser. No. 606,048, Aug. 20, 1975, abandoned.

[51] Int. Cl.$^2$ .......................................... A01K 13/00
[52] U.S. Cl. ...................................... 119/85; 119/92; 128/63
[58] Field of Search ....................... 119/85, 86, 91, 92, 119/157; 128/63; 132/11 A; 15/22 B, 23

[56] References Cited

U.S. PATENT DOCUMENTS

| | | | |
|---|---|---|---|
| 921,143 | 5/1909 | Mylchreest | 119/85 |
| 972,690 | 10/1910 | Goble | 119/85 |
| 2,247,440 | 7/1941 | Hempel | 128/63 |

Primary Examiner—Jay N. Eskovitz
Attorney, Agent, or Firm—Ely Silverman

[57] ABSTRACT

A non-uniformly weighted flexible toothed belt is driven to traverse and produce both a forceful combing action on an animal hide in its traversing motion parallel to pulley-to-pulley movement and a varied yieldable pressure against the hide transverse to such traversing motion and so not only removes animal hairs engaged thereby in an automatic and particularly efficient manner, but also provides for hide massaging and oil distribution. The apparatus comprises a toothed belt supported on spoke-surfaced pulleys, the pulleys rotatably supported on parallel spaced apart plates, one of the plates having a smooth bottom edge and extending further below the axis of the pulleys than the bottom edge of the other plate and acts as a guide and support; one pulley is attached to a drive motor and the belt is sufficiently loose on one side of the pulleys that, while traversing the space between the pulleys, the belt is there yieldably displaced during oscillations transverse to the distance between the rollers and also transverse to the direction of axes of the rollers; the teeth on that portion of the belt face downwardly and resiliently contact the hide hair to provide the above described wave action; the other portion of the belt located between the rollers is tight.

6 Claims, 11 Drawing Figures

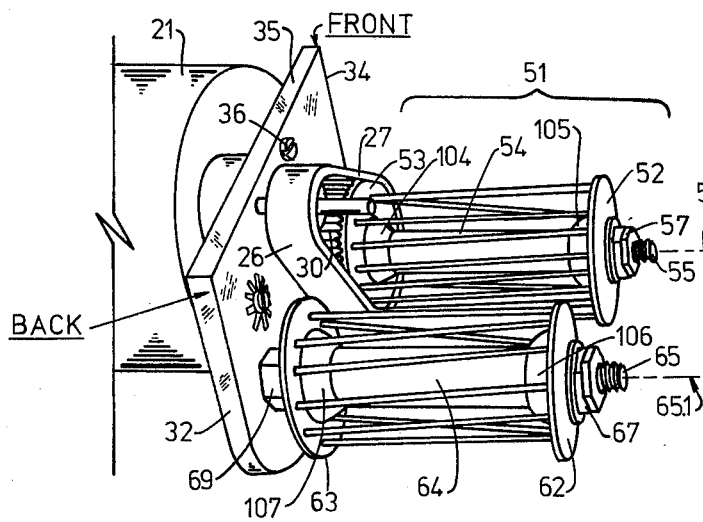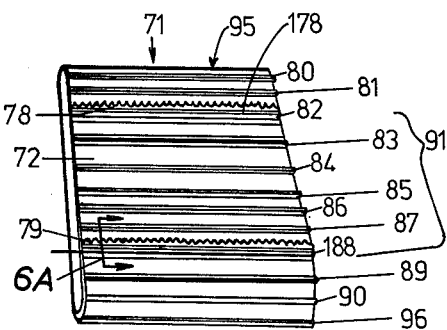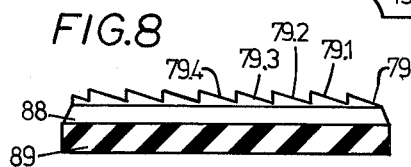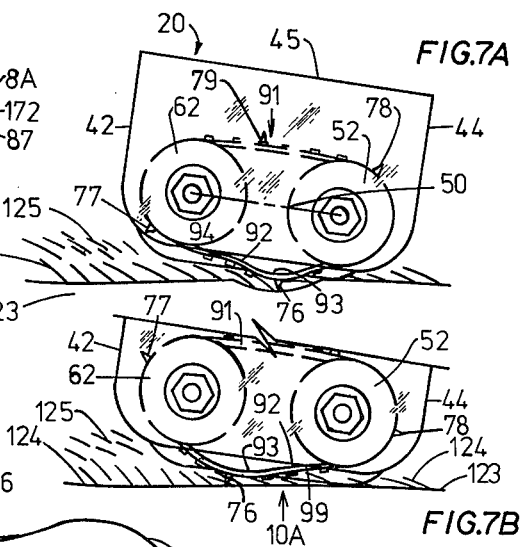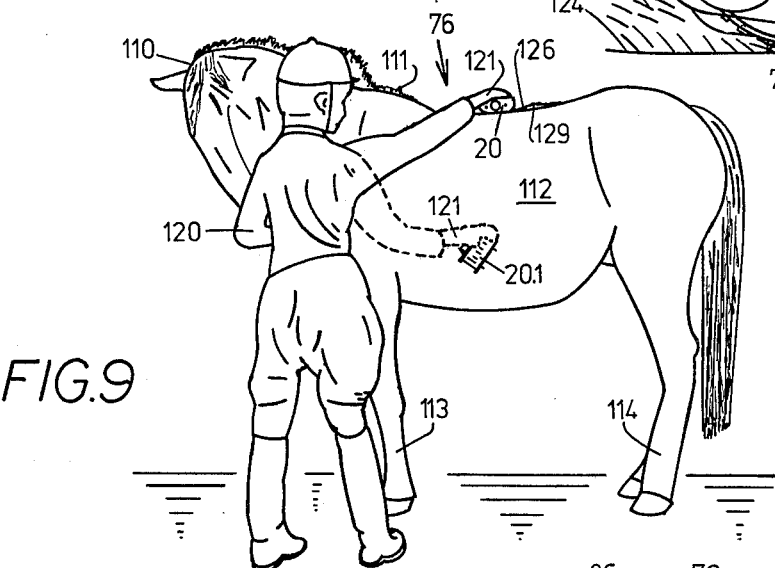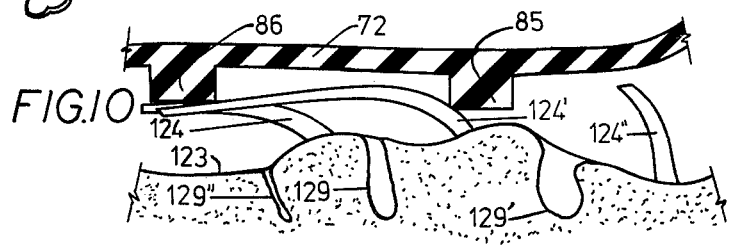

ANIMAL GROOMING APPARATUS AND PROCESS

This application is a continuation of my earlier application Ser. No. 606,048, filed Aug. 20, 1975, now abandoned.

BACKGROUND OF THE INVENTION

The field of art of which this invention pertains is animal grooming devices such as curry combs and utilizing rotary elements.

THE PRIOR ART

While the art of grooming animals has been developed and used for a long time, e.g., positioning of the curry comb teeth has been haphazard and the motion of drawing of the teeth of the comb through the coat of a hair bearing coat of an animal such as a horse has generally been slow and used intermittent movement, while the benefits of massaging treatment of the coat of the animal that could be concurrently accomplished has been neglected, as illustrated in U.S. Pat. No. 455,165.

Notwithstanding the availibility of powered devices at least since U.S. Pat. No. 431,497 in 1890, current devices (as in U.S. Pat. No. 2,753,583)fail to provide the needed gentle, yet controlled pressure of comb teeth against the animal coat to effectively yet speedily engage and remove loose hairs without harm to the animal or undue time consumption by the person caring for the animal, and matting of such removed hairs has been an undesirable problem.

The device of this invention is effective to not only rapidly and effectively cleanse the animal coat while discharging loosened hairs in a loose fluffy mass that does not mat and is readily dispersed, but also provides a massaging action that is gentle, yet rapid and effective, in grooming the animal coat.

SUMMARY OF THE INVENTION

A pair of roller supports a relatively loose non-uniform continuous belt having light belt portions and heavier tooth-supporting and ridged portions whereby the movement of the belt around the rollers combined with the flexibility of the belt means and the tension of the drive rollers provides a varied and yieldable pressure of the currying teeth and massaging ridges in a direction transverse to the distance between the spaced apart rollers against the animal hide while drive rollers urge the teeth forcefully in a direction parallel to the hide surface; thereby a forceful movement parallel to the length of the hide surface with a resilient and varying pressure against the side surface provides a massaging as well as cleansing action. The structure also provides for such movement of the discharge of this apparatus that the loosened and discharged hair does not mat or tangle.

BRIEF DESCRIPTION OF THE DRAWINGS

FIG. 1 has a portion thereof broken away to show the interior location of motor 24 within a casing 21 therefor.

FIGS. 2, 3, and 4 show left, right, front, and back directions.

FIG. 4 is an isometric and perspective view from the upper rear of the partially disassembled apparatus 20 with the plate 41 removed from the shafts 55 and 65, and the belt assembly 71 removed from its normal operative position on the pulley assemblies 51 and 61.

FIGS. 4 and 5 together provide an exploded and partially disassembled view of the apparatus 20 with the belt assembly 71 removed from the pulleys 51 and 61.

FIG. 5 is a perspective view of the belt assembly 71 shown removed from its operative position on the pulley assemblies 51 and 61.

FIG. 6 is a diagrammatic, vertical transverse cross-section through the section 6A of FIG. 5 to show a detail of the toothsupporting structure of the belt assembly 71.

FIGS. 7A and 7B are side views of the apparatus 20 as seen along the direction of the arrow 7A of FIG. 1 during successive stages of operation of the apparatus 20 which to scale are diagrammatic to better illustrate distortion aspects of the belt assembly 71 and the animal skin and hair.

FIG. 7A shows the position of the teeth 76–79 immediately subsequent to the position thereof shown in FIGS. 2 and 4; FIG. 7 B shows the position of belt assembly 71 and teeth 76 and 77 subsequent to the position of such parts shown in FIG. 7A.

FIG. 8 is a vertical cross sectional view along plane 8A of FIG. 6.

FIG. 9 is a pictorial view of an operator 120 using the apparatus 20 on a horse 110.

FIG. 10 is a detail of zone 10A of FIG. 7B.

DESCRIPTION OF THE PREFERRED EMBODIMENT

Figure 1:
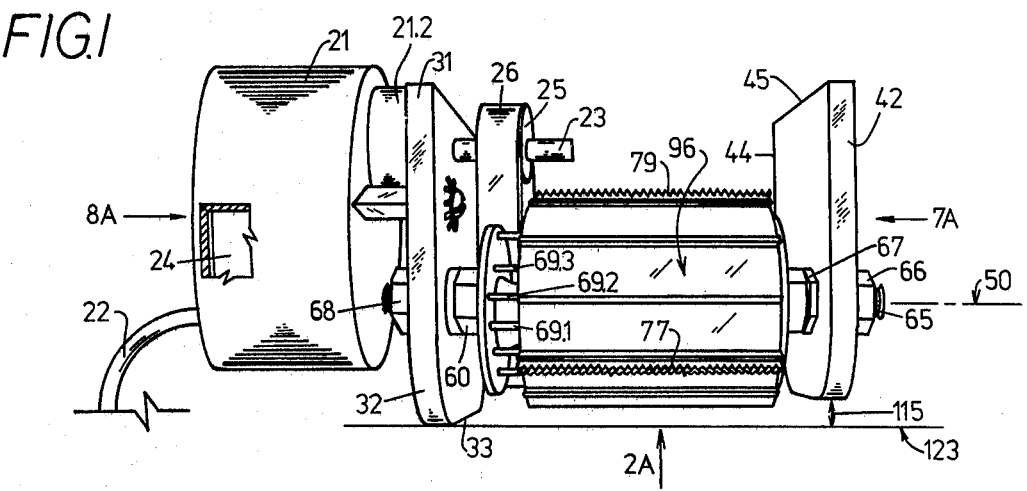
FIG. 1 is a pictorial and scale view along the direction of arrow 1A of FIG. 3.

The apparatus 20 of the invention comprises, in operative combination an electric motor 24, support and guide plates 31 and 41, belt pulleys 51 and 61, and a belt and comb assembly 71.

The electric motor 24 is located in a rigid casing 21; the casing 21 also serves as a handle for the operator 120 to grasp with his hand generally as shown in FIG. 8.

The motor is operatively connected to a power cord 22 which is in turn connected to a conventional plug 29 which is in turn connected to a standard 110-volt electric power source 19.

The electric motor is a conventional ¼ horsepower motor which is operatively connected to an output power shaft 23 through a speed reducer 21.2 attached to the casing 21. The power shaft 23 is operatively and firmly connected by a key 23.1 to a drive pulley 25 which drives a pulley belt 26. The pulley belt has an upper length portion 27 and a lower length portion 28, which portions connect the drive pulley 25 to a driven pulley 53.

Figure 2:
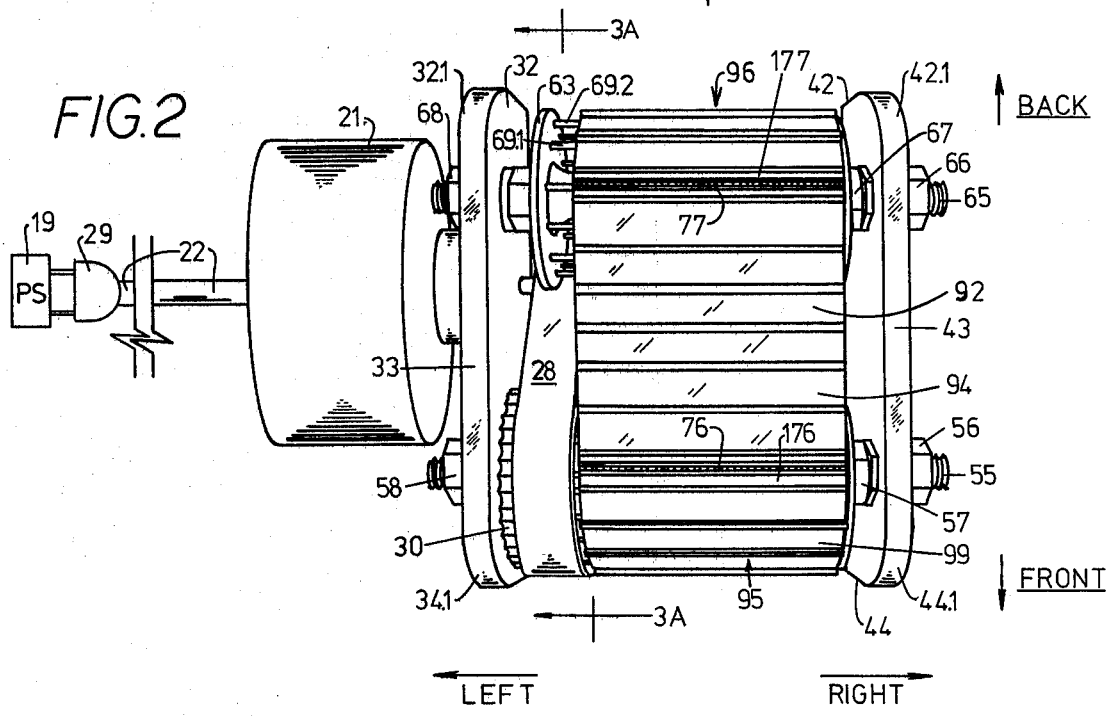
FIG. 2 is a pictorial and scale view of the apparatus 20 as seen from the bottom thereof, as shown in FIGS. 1 and 3 along the direction of the arrow 2A.

The belt 26 is attached to a peripheral rigid milled lip or ring 30 which is attached firmly to the inner disc 53 of front pulley assembly 51 as shown in FIGS. 2 and 4, and coaxial with shaft 55, and drives assembly 51.

A rigid, vertical, longitudinally and vertically extending inner support plate 31 is firmly attached to the casing 21 provided for the motor 24. Plate 31 has a vertical rear edge 32, a vertical front edge 34, a horizontal top edge 35, and a horizontally extending bottom 33. Rear edge 32 is connected to the bottom edge by a rounded corner 32.1, and the bottom edge 33 is connected to the rear edge by a rounded corner 33.1.

A rigid, vertical, longitudinally and vertically extending outer support plate 41 is firmly attached to the plate 31 through the shafts 55 and 65. Plate 41 has a vertical rear edge 42, a vertical front edge 44, a horizontal top edge 45, and a horizontally extending bottom 43; rear edge 32 is connected to bottom edge by a rounded corner 42.1, and the bottom ledge 43 is connected to the rear edge by a rounded corner 43.1. Edges 32, 33, 34, 35, 42, 43, 44, and 45 are straight and smooth; edges 32.1, 34.1, 42.1, and 44.1 are smooth and circular corner edges.

Plates 31 and 41 are each composed of rigid yet thermally insulating, light material such as Lucite (methyl methacrylate), and support the shafts 55 and 65 of the pulleys 51 and 52 and serve to position those shafts relative to each other as well as provide a hand-hold for the operator 120 in the manipulation of the apparatus 20. The plate 41, like the plate 31, is, also, a rigid, smooth-surfaced material such as Lucite which is preferably a heat insulator so as to avoid, on cold days, chilling or contacting the skin of the animal with a material which is such a good heat conductor as to cause chilling of the skin of the animal; also, the edges of walls 31 and 41 are smooth so that they will smoothly move over the skin of the animal, especially bottom edges 43 and 33 and corner edges 32.1, 33.1, 42.1, and 44.1.

A front pulley assemby 51 comprises a rigid outer disc 52, and a rigid inner disc 53 joined by a plurality of rigid spokes 59.1, 59.2, and 59.3, a rigid sleeve 54, and a shaft 55. Bearings 104 and 105 are provided at the end portions of such sleeve 54, and the front pulley shaft 55 is rigid and firmly attached to the inner plate 31 and to the outer plate 41. The inner and outer ends of shaft 55 are threaded. The outer end of shaft 55 is firmly attached to the outer plate 41 by a lateral outer nut, 56, and a lateral inner nut, 57, firmly attached to the outer threaded portion of the shaft 55 while a central outer nut 58 is firmly attached to the inner end portion of that shaft, and another nut is attached to shaft 55 on the inner face of the plate 31. The rigid outer disc 52 and the inner disc 53 are the same size and made of a rigid flat metal plate as steel. These flat plates are joined by the coaxial, rigid, cylindrical sleeve 54. The sleeve 54 is coaxial with and rotates on bearings 105 and 104 near its outer and inner ends as shown in FIG. 4 whereby discs 53 and 52 rotate freely on the shaft 55.

Figure 3:
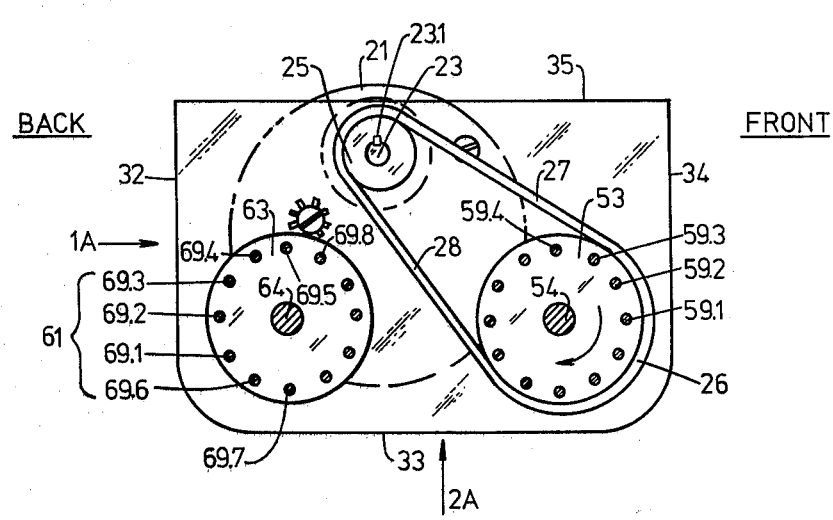
FIG. 3 is a vertical sectional view along the vertical longitudinally extending plane 3A—3A, as shown in FIG. 2.

The spokes 59.1, 59.2, 59.3, and 59.4 and additional eight like and equispaced spokes as shown in FIG. 3 serve to provide a support for one of the belt assembly 71 on discs 52 and 53.

The rear pulley assembly 61 comprises a rigid outer disc 62, a rigid inner circular disc 63, a rigid sleeve 64, and a rigid shaft 65, with nuts 66, 67, 68, and 69. The rigid outer disc 62 and the inner disc 63 are the same size and made of a rigid flat metal plate as steel, as are discs 52 and 53. These flat plates are joined by a coaxial, rigid, cylindrical sleeve 64. The sleeve 64 is coaxial with and rotates on bearings 106 and 107 on shaft 65 as sleeve 64 is provided with bearings 106 and 107 near its outer and inner ends as shown in FIG. 4 whereby to rotate freely on the shaft 65.

The shaft 65 is threaded and is firmly held by a lateral outer nut 66 and lateral inner nut 67 to the outer plate 41 and firmly holds that plate 41 in position relative to the shaft 65. The shaft 65 is held by a central outer nut 68 and a central inner nut 69 as shown in FIG. 1 against the plate 31 and the nut with an additional washer 69.9 holds shaft 65 firmly at a right angle relative to the plate 31. The central longitudinal axis 55.1 of shaft 55 and the central longitudinal axis of the shaft 65 lie in and define a flat pulley axis plane 50.

The spokes 69.1, 69.2, 69.3, 69.4, 69.5, 69.6 and like set of additional six spokes 69.7-8 (shown in FIG. 3) provide a support for the other end of the belt and comb assembly 71.

At any one instant during operation of the apparatus 20, the pulley belt assembly 71 is formed of several functionally distinct although serially connected portions of a continuous belt, i.e., (a) an upper, tight, relatively straight and, at its bottom, flat portion 91 extending from the top portion of the pulley assembly 51, to the top portion of pulley assembly 61, (b) a lower, generally horizontally extended, downwardly convex, and relatively loose bottom portion 92, having some portions as 93 with a small radius of curvature or more curved than the remaining portions thereof, as 94 and 99 (shown in FIG. 7B), said portion 92 extending from the bottom portions of assembly 51 to the bottom portion of assembly 61, (c) a front drive cylindrical drive pulley contacting portion 95 and, (d) a rear, drive, cylindrical driven pulley contacting portion 96.

Belt portion 95 is wrapped around the spokes of the front pulley 61 and firmly contacts such spokes while rear belt portion 96 similarly wraps around and contacts the spokes as 69.1–69.7 of the front pulley assembly 51. The length of each of portions 92 and 91 are substantially the same as the length of each of portions 95 and 96.

The belt assembly 71 comprises a flat flexible belt base portion 72 and a series of like belt ridges as 81–90, and, further, tooth sets as 76, 77, 78, and 79.

The portions 72, 81–90 are formed of oil and water impermeable rubber with smooth exterior surfaces, and the tooth segments as 191, are also water and oil impermeable.

The belt portion 72 is a flexible wide thin continuous rubber belt of substantially uniform thickness and elasticity and in the form of a loop supported on assemblies 51 and 61.

The ridges as 81–90 are parallel strips of approximately square cross section and have a height substantially greater than the thickness of the belt portion 72, i.e., the height of ridges as 87 and 88 as well as 82–87 is twice the thickness of the belt 72 in embodiment 20.

Belt portion 91 comprises a portion of base belt 72, and a plurality of ridge elements (as 83, 84, 85, 86, 87) and a tooth segment as 191 in turn comprising two ridge elements (88 and 188) a tooth set element 79, and a tooth set base mass 179. The ridge elements as 83–87 are spaced at uniform distances along the length of the belt 72 and, with the length of the belt base portion 72 therebetween, form a series of relatively light segments while the tooth segment as 191 is distinctly heavier for the unit of length of belt 72 in which it is carried; the distance between the ridges 88 and 178 is the same as between ridges 87 and 88, 86 and 87, 86 and 85, 85 and 84, and between ridges 84 and 83; and ridges 83–88 and 188 are all of the same length and thickness and height and weight. Each neighboring pair of ridge elements (83–87) and the lengths of the base belt portion therebetween form a ridged segment of two neighboring ridges, as 84 and 85, and the length of belt portion 72 therebetween.

Each of the tooth sets as 79 is a steel plate with many sawtoothed shaped teeth as 79.1, 79.2, 79.3, 79.4 extending outward from the outer edge thereof. These plates are steel jigsaw or hacksaw blades with 23 teeth per 2 inch length; adjacent sets of teeth, as 78 and 79, have a sawtooth diagonal edges extending in opposite directions, and teeth of alternate sets, as 78 and 77 (as one alternate set), extend in one direction) and teeth of other alternate sets, as 79 and 76, extend in the opposite direction (to teeth of sets 78 and 77). Each tooth set as 79 is supported between a pair of adjacent ridges as 88 and 188 in a mass of strong rubber cement as tooth base 179. The tooth base mass 179 fills up the space between and is firmly adherent to the top surface of belt 72, and to the neighboring edges of the ridges 88 and 188 as shown in FIG. 6. Mass 179 extends transversely outward from the outer surface 172 of belt 72 somewhat more (up to 25% more) than the adjacent ridges as 88 and 188. Tooth set 76 is located in a mass 176 located between two ridges like 88 and 188 and filling the space therebetween in the same manner above described for tooth set 79. Tooth set 77 is located in a mass 177 located between two ridges like 88 and 188, and tooth set 78 is located in a mass 178 also located between two ridges like 88 and 188 and attached thereto in the same manner as above described for tooth set 79.

Each of the portions as 91, 92, 95, and 96 are similarly composed of a like series of heavy tooth segments, as 191 in portion 91, of distinctly different weight than the other ridged segments (as 84 and 95 and belt portion 72 therebetween) of equal length to the like ridged portions 94 and 99 in belt assembly portions 92 and 95; each of the portions as 92 is of such length as to extend the distance between points of support thereof on the drive pulleys 51 and 61. Portions 91, 92, 95, and 96 are of the same length.

In operation, the operator 120 applies the apparatus 20 to the hide and/or hair of the horse 110; such application is illustrated in FIG. 9 as applied to the back 111 or the side 112 of the horse.

The movement of the belt assembly 71 of apparatus 20 provides a massaging action, a distribution of the oil in the hair of the animal, and also a combing of loose hair from the hide of the animal as below described.

In operation, the apparatus 20 is held in the position as shown in FIG. 1 with the lower edge 33 of the interior plate 31 in contact with the skin of the animal (as 123). The hair of the animal (124) contacts and supports the lower surface 33 of the plate 31, and dimensioning of apparatus 20 provides a space 115 between the bottom edge 43 and the surface 123 which allows for vertical adjustment of assembly 71 relative to the hide surface 123 and escape of loosened hair 125 as well as for a combing of the remaining firmly held hair 124. The firm hair 124 is accordingly effectively, yet gently combed while the loose hair 125 is removed; additionally, the up and down pressing action of the combs (as 76–79) and ribs (as 81–90) serve to express oil from the skin and distribute oil at base of hair along the hair length.

The ridge elements as 83–87 are sufficiently closely spaced and travel a sufficient distance parallel to the animal skin (while apparatus 20 is still portable) relative to the length of the animal hair (usually ½ to 1½ inches in groomed horses) and the hair firmly fixed to the animal skin (as 124) is sufficiently strong and stiff (although only 0.1–0.3 millimeter in diameter) to cause a massaging action on the skin of the animal as hereinbelow described.

The action of the motor 24 drive belt 26 cause the front pulley assembly 51 to apply tension to the upper portion (as shown in FIGS. 7A and 7B) of the belt 72 while the belt 72 draws on and drives the rear or driven pulley 61, with the result that the bottom portion of the belt 92 is the loosest portion of the belt.

The heavy segments as 93 of the belt as 191 and supporting the teeth as 76–79 are subjected by the drive pulley 51 to the greatest centrifugal force and during operation of apparatus 20 are at greater distance from the pulley axis plane 50, measured transversely to that plane, as shown in FIGS. 7A and 7B, while the other belt segments as 94 and 99 are not thrown transversely so far from such plate 50 (as shown in FIGS. 7A and 7B). Each of such segment portions as 93 which is more greatly displaced from the pulley axis plane 50 by their inertial characteristics than other adjacent segments, as 94 and 99 is not positively, but resiliently and yieldably, displaced in such direction normal to plane 50 while traveling parallel to the pulley plane 50 due to the flexible character of the belt portion 72 and the tension in that belt; accordingly, a wave action results with segments as 93 of the belt assembly 71 regularly and repetitively thrown further out from plane 50 than other portions of belt assembly 71, and that consequent wave action travels in belt assembly 71 from the front or drive pulley 51 to the rear pulley 61 at the speed of motion of the belt segments parallel to the plane 50 and in the direction of motion of the lower belt portion 93.

Such repetitive and regular selective displacement from the plane 50 of tooth bearing segments as 93 during repetitive and/or longitudinal movement thereof, generally parallel to the surface of plane 50 and in a direction from the pulley 51 to the pulley 61, and similar movements of each of the similar segments adjacent to each of the toothed segments occurs in each of belt portions 91, 95, and 96, as those portions of the belt (shown in FIGS. 2 and 5) are brought to the position shown in FIGS. 7A–B for portion 93 during operation of the apparatus 20; accordingly the apparatus 20 produces a massaging action on the skin of the animal 110, as well as that the teeth contacting the hair of the animal provide a combing action on such hair of the animal; further, because of the withdrawal of the extending teeth at the rear of the driven pulley assembly 61 and the elevation of the rear pulley 61 over the hide, the loose hairs engaged by the teeth assemblies 76 and 125 are pulled upward away from the hide rather than jammed longitudinally into contact with the hairs, as 124, that remain attached to the animal skin as 123. Accordingly, the teeth of the tooth assemblies (as 76–79) engage the hairs in a vertically yieldable manner while the teeth are between the pulleys 51 and 61, while the teeth on the portions of the belt as 95 and 96 that are directly supported on the pulleys are urged into contact with the hair 124 that is firmly on the animal and the hair that is loose without such resilient action; such more forceful action is obtained when the apparatus 20 is tilted so that the apparatus rests on the bottom edge 43 of the plate 41. As shown in FIG. 1, by space 115 above discussed, the bottom edge 43 does not extend as far below the plane 50 as does the bottom of portion 96 of belt assembly 71 adjacent to the rear pulley assembly 51, hence provides for support of the apparatus 20 on the hide 123 and hair thereabove while those teeth held by the belt assembly 71 adjacent to the pulley assembly 61 contact the animal hair portions 124 and 125, while support of the apparatus 20 by contact of the edge 33 of plate 31 on the hide 123 and hair 124 and 125 provides that only the resiliently displaced portions as 93 of assembly 71 will contact such hide and hair. Accordingly, a resilient combing and massaging action (by portions as 93) or a vigorous combing action (by portions as 96 and/or 95) may be obtained by the operator 120 depending upon which bottom plate surface, 33 or 43 respectively, is used to provide a pivotal and readily slidable support for the apparatus 20 on the hide 123 and hair 124 and 125 thereabove.

The continually moving series of rapidly moving ridges as 85 and 86 in FIG. 10 yieldably contact the hair, as 124 and 124' firmly adherent to the skin, as 123, and, by friction, briefly yet repeatedly tug on it and, also, bend the hair so contacted close to its connection to the skin and thereby further flex the skin on each such contact (as shown in FIG. 10 diagrammatically). Such repeated sequence of tugging and release and resilient compression and release (due to the above described inertial action of the heavier toothed segments as 191 of the belt assembly 71) compress and release skin glands as 129 and 129' and cause expression of oil onto the hair roots while sidewise motion of the hair is provided because of the zigzag motion provided to such hair from the opposite direction of the sawtooth edge of the teeth of sequentially acting neighboring tooth sets or combs as 77 and 76 and the change of hair position caused thereby on continued traverse of the horse hide and hair by portions of the belt assembly 71 as shown in FIGS. 7A, 7B, and 10.

The action of the apparatus 20 on a horse 110 with a normal coat is illustrated in FIG. 9, where an operator 120, in the position shown in full lines, holds the apparatus 20 in his hand 121 with the plate edge 33 in contact with the hide at the back of the horse (at 111) and there supports the weight of the apparatus 20 while driving the belt assembly from a 110 volt a.c. source of electric power 19 and acting on the coat of the animal 110 as above described therewith. The action of the apparatus 20 deposits an accumulation of loose and fluffy mass 129 of loosened hair at a distance, as 126, usually about 3 to 5 inches, from the nearest (rear) portion of the apparatus 20; such accumulation is readily removed by wiping away with the operator's hand. The effect of operation of the apparatus 20 at the side of an animal 110 is illustrated in FIG. 9 where an operator 120, in the position shown in dashed lines holds the apparatus (shown as 20.1) by his hand 121 at the side 112 of the animal 110. In such location, as well as when grooming the coat of the horse at its legs as 113 and 114, the loose hair and/or dirt discharged by apparatus 20 past, as shown in pictorial FIG. 9, the rearwardly open frame, as shown in pictorial FIGS. 1 and 2, falls as a loose and fluffy mass from the surface from which it is dislodged without matting.

Dimensions and operating characteristics of apparatus 20 are set out in Table I hereinbelow:

TABLE I

INSERT A
DIMENSIONS AND OPERATING
CHARACTERISTICS OF APPARATUS 20

| | |
|---|---|
| Overall weight of apparatus 20 | 3.5 lbs. |
| Length along edge 35 (32 to 34) | 4 inches |
| Height along edge 32 (35 to 33) | 3 inches |
| Width 31 to 41 (interior) | 3.5 inches |
| Axis 55.1 to 65.1 | 2.5 inches |
| Diameter disc 52, 62, 53, 63 | 1.5 inches |

TABLE I-continued

INSERT A
DIMENSIONS AND OPERATING
CHARACTERISTICS OF APPARATUS 20

| | |
|---|---|
| Outer Diameter of circle defined by spokes 69.1–69.8 | 1 7/16 inches |
| Plates 31 and 41, thickness | 1/8 inch |
| Thickness of Belt 72 | 1/16 inch |
| Height of ridge elements 83-88 from surface 172 | 1/8 inch |
| Length of ridge elements (parallel to edge 33) | 1/8 inch |
| Distance between ridge elements 83-84 | 1/4 inch |
| Width of Belt 72 (transverse to edge 33) | 2 3/8 inches |
| Speed of discs 52 and 62 (at no load) in revolutions per second | 7 to 8 rev/sec |
| Maximum extension of surface 172 of belt 72 beyond edge 43 at full speed of motor 24, measured halfway between axis 65.1 and axis 55.1 | 3/8 inch |
| Maximum extension of surface 172 of belt 72 beyond edge 33 at full speed of motor 24, masured halfway between axis 65.1 and axis 55.1 | 1/8 inch |
| As shown in FIGS. 7A and 7B, the height of surface 172 of belt 72 is the same as bottom of pulley belt portion 95 with axis 55.1 and axis 65.1 horizontal with belt assembly 71 stationary | |
| Belt 26 - Width | 1/2 inch |
| Belt 26 - thickness | 1/16 inch |
| Speed of belt assembly 71 | 30–36 inches/sec |
| Total length of belt 72 | 8 1/2 inches |
| Strokes per second by ridge elements as 83-87 | 60–80 strokes/sec |
| Strokes per second by tooth sets as 76–79 | 12–16 strokes/sec |

I claim:

1. An animal grooming apparatus comprising, in operative combination, (a) a frame comprising a vertically and longitudinally extending rigid plate, with a smooth bearing surface at the bottom of said plate, (b) a first transversely elongated longitudinally extending belt support means operatively and rotatably attached to a support means therefor fixedly located relative to said plate for rotation of said belt support means about a first axis fixedly located relative to said plate, (c) a second transversely elongated longitudinally extending spoke-surfaced belt support means operatively and rotatably attached to a support means therefor fixedly located relative to said plate for rotation of said second belt support means about a second axis fixedly located relative to said plate, and wherein said second axis on said second support means is longitudinally spaced away from said first axis in a longitudinal direction transverse to the direction of said first axis, and said first belt support means is spaced apart from said second belt support means by a space therebetween extending along the length of said frame, (d) a power means and casing firmly attached to said frame, (e) (i) a continuous belt assembly supported on said first and second rotatable belt support means, (ii) said belt assembly comprising a continuous flexible belt base having a substantially smooth interior surface and having a substantially uniform thickness and width, and and forming a loop supported on said belt support means, (iii) a plurality of like spaced apart ridge elements each extending outwardly of said belt and transversely thereof and having a substantially uniform size and shape and being firmly attached to said belt base, and equally spaced from each other, (iv) and a comb assembly comprising a comb and a comb support mass, said comb comprising a plurality of rigid teeth each extending outwardly transversely to said belt interior surface, and said comb is attached to said belt base through said comb support mass, said mass being firmly attached to the outer surface of a portion of said belt base, (v) said belt assembly comprising (a) a series of like segments each comprised essentially of a portion of said flexible belt base and said ridge elements attached thereto and (b) a segment comprising another portion of said flexible belt base and said comb assembly, and said comb assembly and the portion of said flexible belt base to which attached form a segment of greater weight per unit length of said belt assembly than the weight per unit length of the segments of said belt assembly comprised of said flexible belt base and said rigid elements, and (vi) said power means is attached to one of said belt support means in driving relation to one belt support means and said belt base is operatively connected to the other belt support means in driving relation thereto and said bearing surface at the bottom of said plate extends below the teeth of said comb in said belt assembly when the belt assembly is stationary and said first axis fixedly located relative to said plate is horizontal and said first axis and second axis are at the same vertical height, and one portion of said belt assembly firmly contacts one of said belt support means, and another, second, portion of said belt assembly is a tight portion extending from one belt support means to the other, second, belt support means and a third portion of said belt assembly extends longitudinally from one of said belt support means to the other belt support means and the ridge elements thereof and teeth thereof extend downwardly from said third portion of said belt assembly and said third portion of said belt assembly is sufficiently loose that the teeth on said third portion of said belt assembly extend below the level of said smooth bearing surface at the bottom of said plate on rotation of said belt support means, and another, fourth, portion of said belt assembly firmly contacts the other, second, one of said belt support means.

2. Apparatus as in claim 1 wherein said frame also comprises a second vertically and longitudinally extending rigid plate with a smooth bearing surface at the bottom thereof, and wherein the teeth of said comb in said belt assembly extend below the level of said bearing surface at the bottom of said second vertically and longitudinally extending plate when said belt support means are stationary.

3. Apparatus as in claim 2 wherein said belt assembly comprises a plurality of like belt assembly portions, each of said belt assembly portions comprising, (a) a series of like segments each comprised essentially of a portion of said belt base and ridge elements attached thereto and (b) a segment comprising another portion of said belt base and a comb assembly and wherein each said comb support means and the portion of said base belt to which attached form segments of greater weight per unit length of said belt assembly than the weight per unit length of said segments of said belt assembly comprised of said belt base and said ridge elements, and the length of the distance between the points of support of said belt assembly on said belt support means is the same as the length of one of said like belt assembly portions.

4. Process of combing and massaging a haired animal skin comprising steps of, (a) passing a continuous series of comb teeth and spaced apart pressure elements in one longitudinal direction parallel to a portion of the surface of the skin of the animal while said teeth and friction and pressure elements are supported on a resiliently distortable longitudinally extending support therefor, and (b) automatically continuously resiliently and yieldably urging each of said series of comb teeth and spaced apart pressure and friction elements against the hair on said skin in a direction transverse to the direction of passing of said comb teeth and toward said skin portion (c) and locating two spaced apart supports for said series of comb teeth and spaced apart pressure and friction elements at a fixed distance from said skin surface, and repeatedly and continuously contacting said hair on said skin by said comb teeth and friction and pressure elements between said spaced apart supports by lengthening and distorting said resiliently distortable and longitudinally extending support in a direction toward said skin and hair and developing a displacement of said teeth and friction and pressure elements toward said skin surface in a longitudinally moving wave motion in said distortable and longitudinally extending support during said motion of said teeth and pressure elements, and said displacement increases and decreases as the distance of said teeth from said supports inceases and decreases and loosening hair from said hide and depositing an accumulation of loose hair as a fluffy mass at a distance from said portion of the haired animal skin.

5. Process as in claim 4 wherein the said supports for said series of comb teeth are continually moved to different areas of said skin of said animal while maintaining said supports for said series of comb teeth at said same fixed distance from said skin surface.

6. Process as in claim 5 wherein alternate comb elements move the hair on the animal skin contacted thereby tranversely to the direction of motion of said teeth and parallel to the skin surface in alternatively opposite directions.

* * * * *